Aug. 22, 1961 R. S. MADEUX 2,997,202
ORIENTING AND FEEDING APPARATUS
Filed Jan. 4, 1957 6 Sheets-Sheet 1

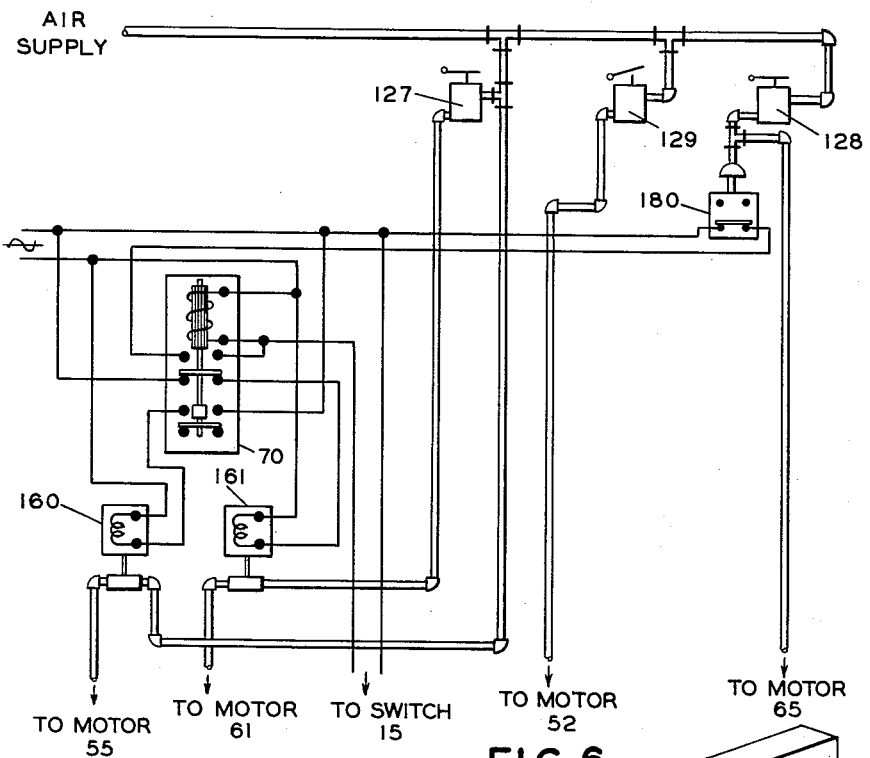
FIG. 6
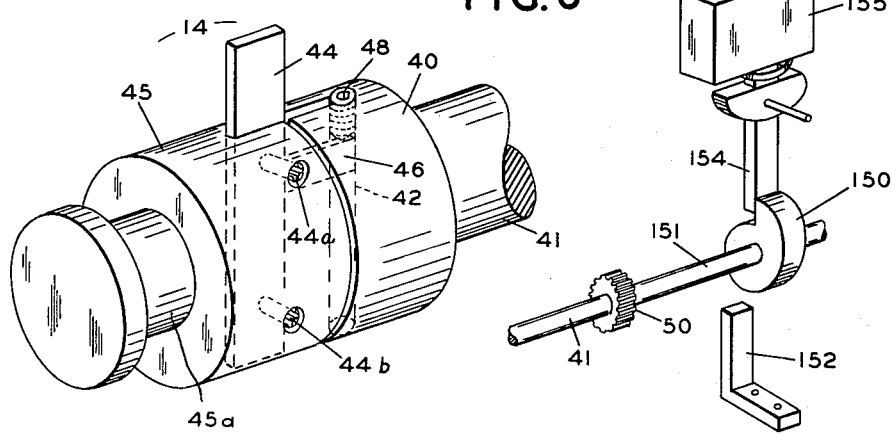
FIG. 4
FIG. 5

Aug. 22, 1961 R. S. MADEUX 2,997,202
ORIENTING AND FEEDING APPARATUS
Filed Jan. 4, 1957 6 Sheets-Sheet 4

Aug. 22, 1961  R. S. MADEUX  2,997,202
ORIENTING AND FEEDING APPARATUS
Filed Jan. 4, 1957  6 Sheets-Sheet 6

United States Patent Office 2,997,202
Patented Aug. 22, 1961

2,997,202
ORIENTING AND FEEDING APPARATUS
Robert S. Madeux, Watertown, Conn., assignor to The Bristol Company, Waterbury, Conn., a corporation of Connecticut
Filed Jan. 4, 1957, Ser. No. 632,440
16 Claims. (Cl. 221—9)

This invention relates to automatic feeding mechanisms of the class in which regular cylindrical objects, as, for example, headless machine screws, are placed in uniform orientation in preparation for use. More specifically, it relates to orienting means by which the orientation of successive cylindrical objects being fed, which are chiefly distinguishable by a symmetrically-disposed raised or depressed area in one end substantially greater in height or depth, respectively, than any similar characteristic in the other end, is accomplished by a feeler mechanism sensitive to the said characteristic and operative to reverse the end-to-end position of those objects not in the preferred orientation.

A common use of such a device is, for example, in conjunction with an automatic screw driver. In conventional equipment of this class, the common types of headed machine screws are placed in a tilted rotating hopper from which they are collected by some selecting means and fed by gravity along a track or tube to an escapement device whereby they are released, one by one, to mechanical fingers by which each screw in turn is gripped and held. In this position, the screw is engaged by the screw driver and driven into the workpiece. In the case of headed screws, the problem of proper orientation of screws in the feed line is commonly solved by providing means in the supply hopper so that they fall first into aligning slots, and then, as the hopper rotates, they drop from said aligning slots into a track where they are suspended by their heads. Those falling upside down are not engaged by the track and fall back into the hopper to be recycled. The others slide down the feed line to the screw driver. In the case of many types of hollow-head setscrews, however, there is no such regular external characteristic by which they may be conveniently sorted.

It is therefore an object of this invention to provide a feed mechanism whereby objects, cylindrical or otherwise, characterized by a predominant characteristic in one end may be automatically and singly taken from a heterogeneously oriented supply line and delivered in a uniform orientation.

It is a further object to provide an orienting mechanism for a succession of regular cylindrical objects which are characterized by a predominant characteristic at one end, in which, in a line of said objects heterogeneously disposed, a feeler mechanism determines the presence or absence of said characteristic in each successive object and passes each object along unchanged or reverses it, depending on the orientation desired with respect to said characteristic, the mechanism being arranged to "remember" the position of the reversing means as left by the object next preceding.

Another object is to provide an orienting mechanism for cylindrical objects having characteristically different ends which will operate upon a feed supply of said objects heterogeneously arranged with respect to the ends in a manner to pass along to a discharge line 100 percent of the objects fed.

A still further object is to provide an automatic screw-driver mechanism in which the driving-stroke operation of the screw-driver spindle (to drive a screw into a workpiece) simultaneously initiates a cycle of operations including, successively, restoring the mechanism from previous orienting operations, accepting a next screw from the feed line, and presenting it in a position opposite to the feeler mechanism; in the released-stroke operation of the screw driver, the cycle of operations is completed by momentary descent of the feeler mechanism, whence the orientation position of the retained screw is determined, and, dependent on the finding of said feeler, the screw is dropped in the work position or reversed end-for-end and dropped into this position.

Other objects and advantages will be apparent from the following detailed description in conjunction with the accompanying drawings, wherein FIGURE 1 shows schematically, by way of example, the operating mechanism of an automatic screw driver to which are applied cycle-establishing elements of my invention;

FIGURE 3 shows in detail, partly in section, the orienting head with gate member open;

FIGURE 4 shows the orienting head of FIGURE 3 with gate member closed;

FIGURE 5 shows alternative cam mechanism for determining various positions of the orienting head; and FIGURE 6 shows schematically the interconnection of elements for an alternative electropneumatic system to accomplish the purposes of the invention.

Figure 1:
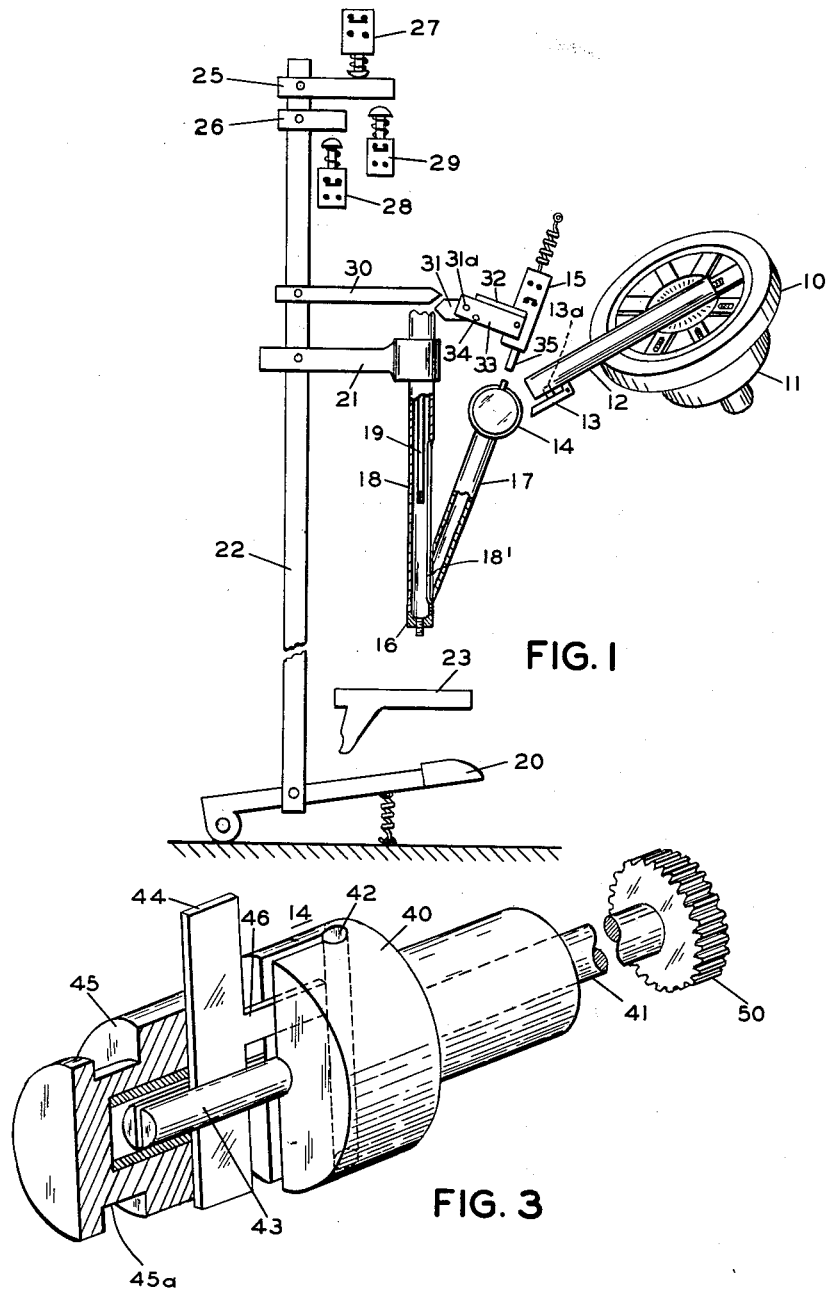

Referring now to FIGURE 1, a rotating hopper 10 driven by motor 11 feeds socket-type, headless screws in random orientation into tube 12, through which they fall by gravity until stopped by gate member 13. Here, they are fed, one by one, into orienting head 14. For each screw, a feeler switch 15 operates to sense the conformation of the end presented for examination. The head 14 and its associated mechanism is shown and described in detail hereinafter. When orientation of a screw has been determined and proper orientation effected, the screw passes through tube 17 into the hollow finger 18 where it is positioned by holding member 16. The finger 18, supported by arm 21, is moved downward past the fixed feed tube 17 through the action of the foot pedal 20 and operating rod 22, and makes registration with a workpiece (not shown) on platform 23. Also, under control of foot pedal 20 and by parallel mechanism, well known and forming no part of this invention, and, hence, not shown, is rotating means attached to wrench or screw driver 19 within finger 18. Simultaneously with lowering of finger 18, said wrench 19, rotated by a power source not shown, is also lowered to make engagement with said screw, driving it into the said workpiece. The finger 18, wrench 19, pedal 20, and operating rod 22 are parts of well known and conventional power screw-driving mechanism, which will be hereinafter further illustrated. The motor-driven hopper 10 may also be of a type well known in power screw-driving machines.

The cycle of component operations which results in the feeding of the screws in proper orientation for use by the screw driver is conveniently effected in the illustrated example by the foot pedal 20 which also actuates the screw-driver finger. The operator may readily bring a work piece into screw-receiving position on the platform 23 during the upstroke of the pedal 20, or at any time before depressing the pedal sufficiently to drive the screw into the workpiece. Obviously, however, a variety of other means could be employed for operating the screw driver, and other means for timing cyclic operations of the feeding and orienting means could also be used alternatively, depending on the use to which the device of this invention is applied.

As above noted, the spring-opposed foot pedal 20 engages an operating rod 22 arranged for a limited vertical motion, which motion is primarily intended to move the finger 18 and the screw driver, or socket wrench 19 within finger 18, to and away from its operating position. In addition, however, I attach to said rod 22 switch-operating arms 25 and 26, so that, in cooperation with electrical switches 27, 28, and 29, certain sequential switching operations are performed on the down stroke of said rod, as described hereinafter, in the order, as shown, first, switch 27; second, switch 29; and third, switch 28. The reverse of this sequence takes place on the up stroke of the rod 22. I further provide in these sequential operations a mechanical tripping mechanism which, as shown, may consist of a rigid tripper 30 mounted on the operating rod 22. At the proper time, this is brought into engagement with mating finger 31 which forms part of a unidirectional lever system, pivoted about point 31a. In counterclockwise motion, this latter finger 31 moves against the force of a flat restraining spring 32 but transmits no motion to lever 33; in clockwise motion, finger 31 engages pin 34 and moves lever 33 clockwise about said point 31a. Attached to said lever 33 is sensing switch 15 whose function is to be described hereinafter. The effect, therefore, of this assembly, due to the yieldable joint, is such that, as tripper 30 moves downward, mating finger 31 trips but transmits no motion to member 15. In the opposite sense, the upward tripping motion of finger 31 moves the now rigid lever system including 31, 33, and 15 in such a direction that a sensing pin 35 associated with switch 15 makes a momentary exploratory contact with a screw held in the orienting head in a manner yet to be described.

Figure 2:
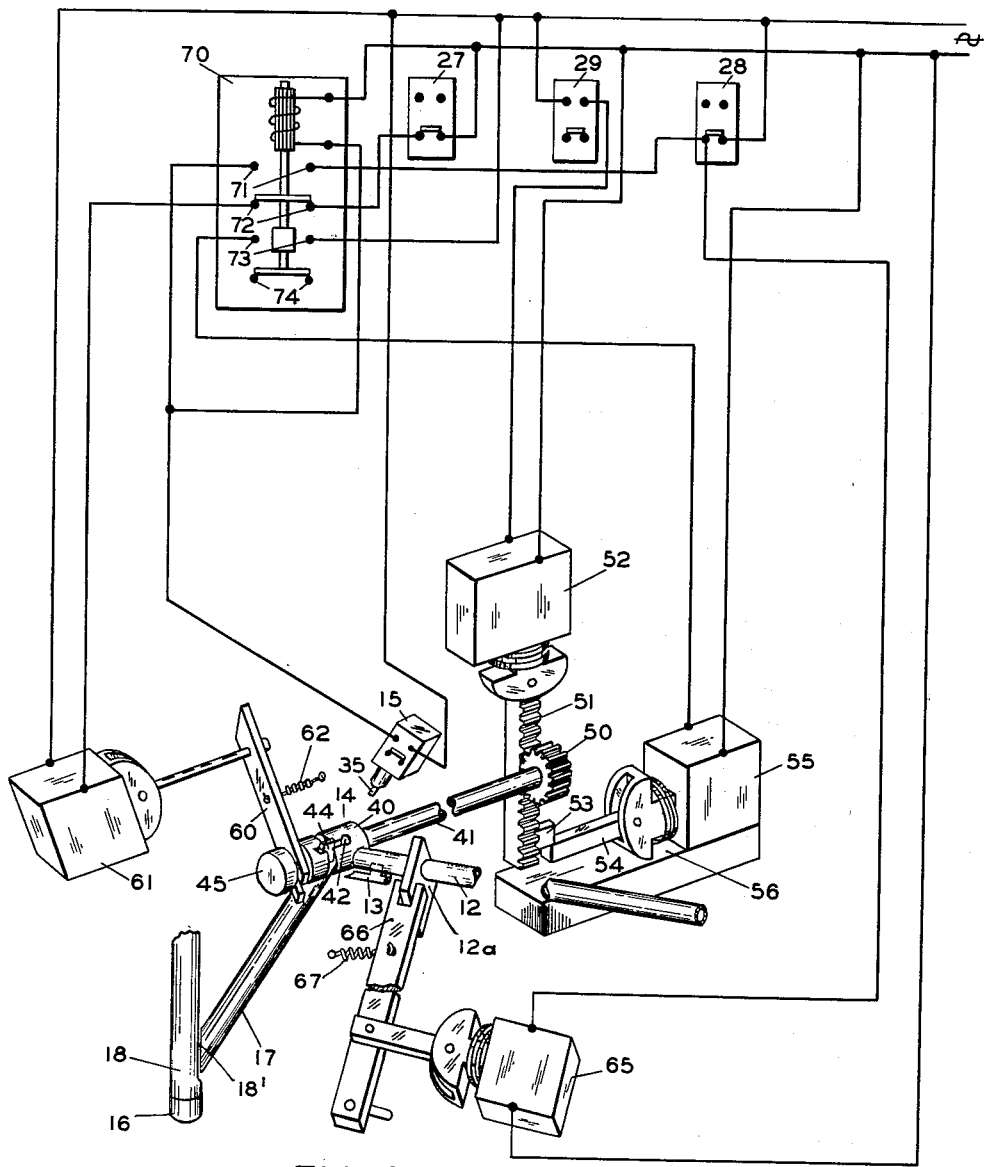
FIGURE 2 shows schematically the disposition of operating elements and electrical connections therebetween to accomplish the purposes of the invention.

An orienting mechanism adapted for operation in accordance with the principle of my invention is shown in FIGURES 2, 3, and 4 and is constructed as follows;

Orienting head 14 (as shown in detail in FIGURES 3 and 4) comprises a cylindrical body member 40, one end of which is attached to shaft 41. At the other end is formed a transverse hole 42 slotted on one side and terminating in a slotted shaft extension 43 of reduced diameter. A separable member 45 is slidably fitted on said shaft extension 43 and has formed at one end a hub arbor section 45a for operations presently to be described. Said separable part is also slotted transversely and, in this slot, receives gate member 44. The position of this gate may be adjustably fixed by set-screws 44a and 44b by which it is normally held in a fixed position in the slidable member 45. Arm 46 of gate 44 fits into the slot in member 40 whereby it can be inserted into or withdrawn from the passage 42. The said orienting head 14, comprising member 40 keyed by gate 44 to separable member 45, is capable of partial rotation about the axis of the shaft 41. This rotary motion is imparted to the head by the spur gear 50 (FIGURE 2) fixed to the outer end of the shaft and meshing with rack 51. This rack is attached to the armature of solenoid 52 by which it is moved. At the outer end of the rack is a detent or lug 53 which may rest against stop 54, or if stop 54 is withdrawn by action of solenoid 55 to which it is attached, the rack will rest on bed-plate 56. By this means, it may be seen that the head 14, and, in particular, the screw-receiving hole 42 which it bears, may assume three positions: the first when the solenoid 52 is energized and the armature is in the wholly withdrawn position; the second with solenoid 52 unenergized and solenoid 55 also unenergized when detent 53 rests against stop 54; and the third with solenoid 52 unenergized and solenoid 55 energized, whence the rack 51 rests against bed-plate 56. Thus, the receiving aperture is movable clockwise (looking along the shaft from the end of head 14) to position 1 opposite the end of the feed tube 12; second, counterclockwise to a point opposite the sensing pin 35 of the sensing switch 15 (about 30° from position 1); and third, counterclockwise 180° from position 2 to a position opposite the discharge tube 17. In FIGURE 3, the head assembly 14 is illustrated with the separable member 45 withdrawn from the body 40, and gate 44 open; while in FIGURE 4, the parts 40 and 45 of head 14 are shown in close engagement, with the gate 44 closed, thereby retaining a screw 48 in position for automatic examination.

The separable member 45, which is keyed through gate 44 and arm 46 to the head 40 for rotation therewith, is engaged at its hub or arbor portion 45a, by the forked link 60 (FIG. 2) attached to the armature of solenoid 61; whereby, upon energization of the solenoid, the member 45 is retracted to its FIG. 3 position. When the solenoid 61 is deenergized, the member 45 is restored to its closed position (shown in FIG. 4) by a spring 62 attached to the link 60. As previously noted, the gate member 44, which keys the member 45 to the head 40, is movable in a slot in the face of member 45, mating with a slot across the diameter of body 40 and deep enough to include the hole 42. The arm 46 of said gate member 44 is fixed in relation to the length of the screws being accepted by the apparatus, and the travel of the separable member 45 is limited to approximately the diameter of the aperture of 42. In one position, it acts through the arm 46 to form a gate to hold the screw; in the withdrawn position, it allows the screw to fall through the hole.

The feed tube 12 is terminated by spring-closed gate or escapement member 13. It is slidably movable through a short distance from its position shown in FIG. 1 to a position wherein it makes contact with head 14 to deliver a screw to the opening 42 in said head. For shifting the tube there is provided a forked lever 66, which at one end engages a plate or lug 12a on the tube 12 and at its other end is connected to the armature of a solenoid 65. Said armature may be considered normally energized whereby the feed tube 12 is held in a retracted position. Upon de-energization of the solenoid, under constraint of spring 67 connected to lever 66, the feed tube 12 is moved to a position wherein the end of the tube contacts the orienting head 14 and concurrently the gate or escapement 13 is deflected by contact with said head to withdraw its lug or stop member 13a from the position shown in FIGS. 1 and 2 wherein it blocks passage of a screw to the end of said tube 12. The screw which abutted said stop 13a is thereby released for passage into the opening 42 of the orienting head 14 which, as hereinafter noted, has in the meantime been rotated sufficiently to bring said opening into position for receiving the screw from the feed tube. When the solenoid 65 is energized, the feed tube 12 is again retracted to its position shown in FIGS. 1 and 2.

The sequence of operations may be summarized as follows:

(a) The screws are fed from the rotating hopper device 10 into tube 12 in random orientation with either the sockets up or the points up.

(b) Head 14 rotates clockwise (either 30° or 210°, depending upon the position it was left in the previous cycle) so that the cross hole 42 in head 14 is under and in line with tube 12.

(c) Tube 12 descends, gate 13 automatically opens, tube 12 dwells momentarily, and screw drops, either socket up or point up, into hole 42 in head 14. (Screw is prevented from dropping through head 14 prior to examination by the closed retractable gate arm 46.)

(d) Tube 12 ascends and gate 13 automatically closes, which lifts the column of screws in tube 12. This is necessary in order to prevent a pointed end of a screw in tube 12 from becoming interlocked with a socket of a screw deposited in head 14. If this interlocking were permitted, it would prevent the rotation of head 14, causing "jamming."

(e) Head 14 rotates counterclockwise 30° to a position under sensing switch 15.

(f) Sensing switch 15 descends. If the screw in head 14 is socket-end up, the plunger sensing pin 35 of switch 15 enters the socket-end and is not operated. This causes gate 44 to open, permitting the screw to drop through head 14 and into tube 17 and finger 18 with its socket up. If the screw in head 14 is point up, the plunger of switch 15 is operated. This causes stop 54 to be pulled out which causes head 14 to rotate 180° counterclockwise, thus turning the screw over and dropping it in tube 17 and finger 18, also with its socket up.

According to FIGURE 1, the cycle of operations established by the foot pedal takes place in the following order: On the down stroke of the foot pedal, (I) Switch 27 releases and breaks a circuit;
(II) Trip mechanism passes but does not move switch 15;
(III) Switch 29 operates and closes a circuit;
(IV) Switch 28 operates, breaking a first circuit and a second circuit.

On release of pedal, (V) Switch 28 release, making the first and second circuits;
(VI) Switch 29 releases, breaking a circuit;
(VII) Trip mechanism engages and moves switch 15;
(VIII) Switch 27 closes, making a circuit.

In addition to the contacting switches 27, 28, and 29, the operations are further coordinated through an electrical relay 70 (FIG. 2) having two pairs of make-and-break contacts; one set marked 71 and 72 are arranged to operate instantaneously on energization of the relay coil, the others marked 73 and 74 operate after a brief time delay. Such relays are familiar articles of commerce (for example, Allen-Bradley Company, Milwaukee, Wisconsin, Style AX, Bulletin 849) and, in themselves, form no novel feature of my invention. The winding of the relay 70 is connected in series with contacts of the switch 15 which are normally open but are adapted to be closed when the sensing finger 35 of the switch moves upwardly with respect to said contacts.

In considering in detail the response of the mechanism to the above sequence of control impulses, two cases must be distinguished, depending on the state in which the mechanism is left by the screw preceding the one being considered. First, therefore, let us assume that the previous screw was in the position of socket up, that is, in the orientation desired for use in the screw driver. As the foot pedal moves downward, then, (I) On first movement of the foot pedal, switch 27, which initially is held closed, opens as the result of downward movement of the operating arm 25. Although contacts 72 of time-delay relay 70, are, under the assumed conditions, closed, the opening of the switch 27 breaks the circuit through the solenoid 61, where-upon spring 62 closes the gate 44 in the orienting head 14.

(II) The tripper 30 then passes mechanical finger 31 without affecting the sensing switch 15, as hereinbefore described.

(III) Next, switch 29 is closed by the further descent of the arm 25, energizing solenoid 52. This pulls up rack 51, rotating head 14 through about 30° to a position wherein the hole 42 is opposite the end of feed tube 12.

(IV) The normally closed contacts of switch 28 open as a result of the downward movement of arm 26, opening thereby two circuits, one connected with contacts 71 of relay 70, the other with solenoid 65. This action produces no effect in the former circuit, since contacts 71 of the relay are already open, and, thus, the connection through these contacts to switch 15 simply remains broken. In the latter circuit, the opening of the normally closed contacts de-energizes solenoid 65 and tube 12 thereupon moves to make contact with head 14 which has been rotated, according to (III) above, whence gate 13 is operated by this contact with the head 14 releasing thereby a screw into aperture 42.

Foot pedal 20 has now reached the bottom of its travel, whence it is released, and the following sequence of operations continues:

(V) The normally closed contacts of switch 28, which were opened by the descent of arm 26, are now re-closed, energizing solenoid 65, thereby retracting feed tube 12. Immediately on losing contact with head 14, gate 13 closes and separates the column of screws from the single screw deposited in the receiving hole 42. Simultaneously, the second circuit, involving contacts 71 of relay 70 is restored to the control of said relay.

(VI) The normally open contacts of switch 29, held closed since operation (III) above, now open, de-energizing solenoid 52, permitting rack 51 to fall to a position determined by stop 54. This rotates the head 14 and the receiving hole 42, now bearing a screw, back 30° to a position opposite the sensing pin 35 of switch 15.

(VII) The tripper 30 now engages the trip finger 31, and, because in this direction of motion the yielding joint becomes a rigid lever system pivoted about 31a, switch 15 is moved downward to bring the sensing pin 35 in position to determined the presence or absence of a socket in the screw held in the head.

Since the succeeding events in the cycle depend on the finding of this sensing motion, two further cases will be considered: (A) the case in which the screw being examined has its socket "up," and (B) the case in which this screw is found with its point "up." Considering, first the situation (A), the cycle proceeds as follows:

(VIIA). The descending sensing pin 35 enters the depression formed by the socket which is of sufficient depth that the normally open contacts of switch 15 are not operated. This indicates that no corrective action of the mechanism is required and the head remains stationary. The tripping action is momentary, and, thus, the switch is immediately withdrawn.

(VIIIA). At the end of the upward return motion of the foot pedal 20, normally closed contacts of switch 27, which were opened by descent of the arm 25, are again closed, energizing solenoid 61 through closed contacts 72, and thereby pulling apart the separable member 45 from head 14 and opening the gate 44. The screw is thus allowed to fall through the hole in the head member and down tube 17 into the finger 18 to be placed in position for engagement by the screw driver which during the foregoing cycle of operations has, on the down stroke, been driving in the previous screw and, on the up stroke, been withdrawn from the driving position.

Alternatively, if the screw in the head is with its point "up," case (B) above, the following events take place:

(VIIB). The descending sensing pin 35 encounters the obstruction formed by the screw point, and this closes the normally open contacts of switch 15. This operates relay 70 which has two sets of contacts, one set operative immediately, the other operative after a short time delay. Of the former, the normally open contacts 71 are closed, and a circuit is completed through the normally closed contacts of switch 28 (which, according to operation V, are closed) which "locks in" relay 70. Now, though switch 15 is retracted and its normally open contacts are opened, relay 70 remains energized, and, after a delay long enough so that sensing pin 35 may be withdrawn far enough to clear the movement of the head, then the normally open delayed contacts 73 close, which operates solenoid 55. This withdraws stop 54 and allows rack 51 to fall to its extreme position. The head 14 is thereby rotated 180° in a counterclockwise sense, whence the screw retained in aperture 42 is presented to the end of the delivery tube 17 with point end down, as desired. It now falls through tube 17 into finger 18 ready for use. A suitable opening 18' is provided in the wall of the finger for enabling the screw to pass from the tube 17 into the interior of the finger.

(VIIIB). At the end of the pedal motion, as in the previous case, switch 27 is operated to close its previously opened contacts. However, since, as shown in (VIIB) above, relay 70 is "locked in," contacts 72 are open and solenoid 61 remains unenergized, and trap 14, now in an inverted position, remains inverted and with gate 44 closed. In this position, the apparatus awaits the next operation of the foot pedal.

Returning to the initial assumptions, let us now assume that the screw immediately preceding was, as we have just considered, fed into the orienting head with its point up, whence at the end of the cycle the mechanism remains as in (VIIIB) above. Now, as the pedal is depressed:

(IA). As before, first, the normally closed contacts of switch 27 open, but this time nothing happens, since the now open contacts 72 of "locked-in" relay 70 are still interposed between switch 27 and solenoid 61. In effect, then, gate 44 is still closed and aperture 42 is in an inverted position.

(IIA). The trip finger passes the trip mechanism without effect.

(IIIA). The normally open contacts of switch 29 now close, which energizes solenoid 52. As described in (VIIB) above, rack 51 is found in its fully extended position, stop 54 being also withdrawn. The effect of energizing of solenoid 52, therefore, is to pull up the rack 51 and rotate the head through its full 210°, placing the aperture 42 in position to accept a new screw from the feed tube 12.

(IVA). The normally closed contacts of switch 28 open, thus breaking the "lock-in" circuit to relay 70. This relay, now de-energized, effects a second break in the "lock-in" circuit through contacts 71 and closes contacts 72 with no immediate result but effectively returning solenoid 61 to the control of switch 27. Contacts 73 also open and, in so doing, de-energize solenoid 55, allowing stop 54 to take a position to limit the motion of rack 51 when it engages detent 53.

Meanwhile, the second circuit connected to the normally closed contacts of switch 28 opens, de-energizing solenoid 65 by which the feed tube 12 is, as before, moved into a position juxtaposed to the aperture 42, the gate 13 opens, and a screw drops into said aperture. The mechanism is now in exactly the state left in step (IV) in the initial case, and succeeding steps may be followed as hereinbefore described.

Some illustrative modifications of the hereinbefore-described mechanism may now be described:

For example, in FIGURE 5 is shown alternative means for operating the orienting head 14. Herein, all elements of FIGURE 2 are assumed, except that motor element 55 becomes element 155 placed as shown with respect to the spur gear 50 and identical in purpose with its counterpart. Shaft 41 is now extended to bear a cam member 150 whose edge forms a stop when intercepted by detent 154 and stop 152. Gear 50 is, of course, associated with motor element 52 and rack 51 of FIGURE 2. In operation, the mechanism operates exactly as hereinbefore described with the substitution of the means shown for causing the several limitations of motion of the orienting head.

As a further variation of my invention, I have shown in FIGURE 6 a system for electropneumatic operation. This is a close counterpart of the embodiment of FIGURE 2, except for the substitution of well-known pneumatic components for electrical switches and power actuators. For example, in FIGURE 6, the electrical contactors 27, 28, and 29 of FIGURES 1 and 2 are replaced by fluid-operated on-off pilot valves 127, 128, and 129, respectively. Such pilot valves are commonly used; as an example may be cited such a device covered by a U.S. patent application, Serial No. 325,469, dated December 11, 1952, now Patent No. 2,780,242, February 5, 1957, and assigned to the same assignee as the present application. These valves may be positioned in the same way as the corresponding switches in FIGURE 1 and, likewise, may be sequentially operated by the operating shaft 22 in a manner essentially identical with the former case.

The motor actuator elements of FIGURE 2, numbered 61, 52, 55, and 65, are here replaced by fluid-operated piston actuators of conventional design. Their functions are identical with the corresponding electrical elements in FIGURE 2. Hence, in the present illustration, for simplicity, the motor actuators and the associated feeding, orienting, and utilizing mechanism are omitted. Only the interconnection of the control elements in this system is shown in this case.

For convenience, the electrical sensing switch 15 is retained in this embodiment and also time-delay relay 70. In order to make the necessary interconnection of electrical and fluid-pressure circuits, two normally closed electrical solenoid-operated valves 160 and 161 are provided in association with relay 70 and a fluid-pressure switch 180, normally open, in association with pilot valve 128. All of these components are of common commercial design.

In operation, this system differs only in minor details from the hereinbefore-described all-electrical system:

Fluid pressure and electrical power are supplied from suitable sources of supply. With the cycle-initiating foot pedal 20 (FIGURE 1) at rest, valve 127 is open, thus supplying fluid pressure through valve 161 (which is held open in the case illustrated by power supplied through relay 70), thus holding motor 61 in the operated state and causing gate 44 to be held open. The first operation of the cycle, on movement of the foot pedal, is to close valve 127 which cuts off the supply of fluid pressure to motor 61 thereby causing closing of gate 44. Now, as before, the finger passes the sensing-switch operating mechanism without effect, and the operating rod moves on to effect operation of valve 129. This supplies pressure to motor 52 to effect withdrawal of the rack 51 and movement of the orienting head 40 into position to receive a screw from the supply line. Finally, on the down stroke of the pedal, valve 128 is released which does two things: (a) it opens the "holding" circuit to relay 70 if it is in the "holding" positions; and (b) it removes fluid pressure on motor 65, thus advancing the feed tube 12 and thereby depositing a screw in aperture 42. On the up stroke of the pedal, first, valve 128 is closed, thus remaking a circuit to the holding contacts of the delay relay 70 and withdrawing the supply tube 12 through operation of motor 65. The sensing switch 15 is then operated by the tripping mechanism and, depending on the finding of the feeler pin 35, either sends an electrical impulse to close relay 70 or fails to send this impulse. If relay 70 is operated, it is thereupon "locked" closed and also, through opening of the contacts connected to solenoid valve 161, effects closing of that valve, with consequent closing of the fluid-pressure line to motor 61, regardless of further changes in pilot valve 127. After a brief delay, further contacts of the relay 70 energize solenoid valve 160, thus operating motor 55 to cause the orienting head 14 to rotate 180° to turn the screw end-for-end before depositing it in the discharge tube 17. Finally, at the end of the cycle, pilot valve 127 is operated, and, as noted above, if meanwhile valve 161 has been operated, nothing happens; if, on the other hand, sensing switch 15 has not caused the operation of relay 70, final operation of valve 127 operates motor 61, opening gate 44 and allowing the retained screw to drop directly through to the discharge tube. Other modes of operation can be traced in a similar way as in the above-described wholly electrical system.

Though the device has been described as applied to socket-head screws, it is to be understood that slotted heads or any other type characterized by a distinguishable depression on one end can be similarly treated. Furthermore, by replacing the pointed sensing member by a member in the end of which is formed a recess, it is apparent that the apparatus will operate to orient objects with respect to a raised area, or point, should such be desired.

Also, though I have described an embodiment of my invention applied to an automatic screw-driving machine, it will be obvious that other uses are possible, as, for example, magazine loading and, also, for orienting objects other than screws which, as noted, are generally distinguishable by a depression at one end.

Advantages of my invention over prior art include the following:

This device inspects, corrects the orientation and delivers each object fed to it. This 100 percent delivery is a marked improvement in efficiency over prior-art devices which are based on the rejection of misoriented objects and subsequent rehandling thereof.

The fact that an object is delivered in proper orientation for each cycle of operation permits it to be applied advantageously to a machine such as the automatic screw driver hereinbefore described by reason of the ready adaptation of said cycle to the cycle of the associated equipment, regardless of its rate of operation. Each stroke of said equipment thereby becomes a work stroke.

The sensing member may be made operative on a very small difference in depression between the ends of the inspected object. It is, thus, capable of distinguishing for example, between the ends of a cup-pointed, hollow-head screw or for slotted-head screws.

The feeler point can be of very fine and delicate construction adaptable, for example, to extremely small set-screws, since it performs no work on the screw and is required only to operate the associated sensing switch.

The electrical system is designed to sense the orientation; to effect reorientation, if required, to delay reorientation in order to prevent interference of sensing pin with movement of the orienting head; and to "remember" the disposition of parts of the mechanism as left by the last object transmitted.

Speed of operation is assisted by the weight of the column of objects in the feed tube which tends to accelerate the ejection of each unit into the receiving aperture, and, on reversal of the head, the centrifugal force of the head is imparted to the oriented object, which tends to throw the said object into the delivery tube.

The only change to accommodate objects of different length is to change the position of the gate member 44 which is fixed in position by locking setscrews 44a and 44b (FIGURE 4). For objects of different diameter, the head 40 and tubes 12 and 17 are replaced by ones with holes of appropriate size.

FIGURES 7 to 10 show more in detail an apparatus comprising a screw-driving machine and one form of mechanism embodying the principles of my invention for orienting and feeding screws to said machine. In discussing these figures, reference will be made to the schematic diagrams of, particularly, FIGURES 1 and 2 to identify the elementary parts shown therein as they might appear in an embodiment of the device such as that illustrated in FIGURES 7 and 8. It will be apparent that differences in detail between this embodiment and the more schematic showing in FIGURES 1 and 2, do not constitute differences in the principle of operation of my invention.

Figure 7:
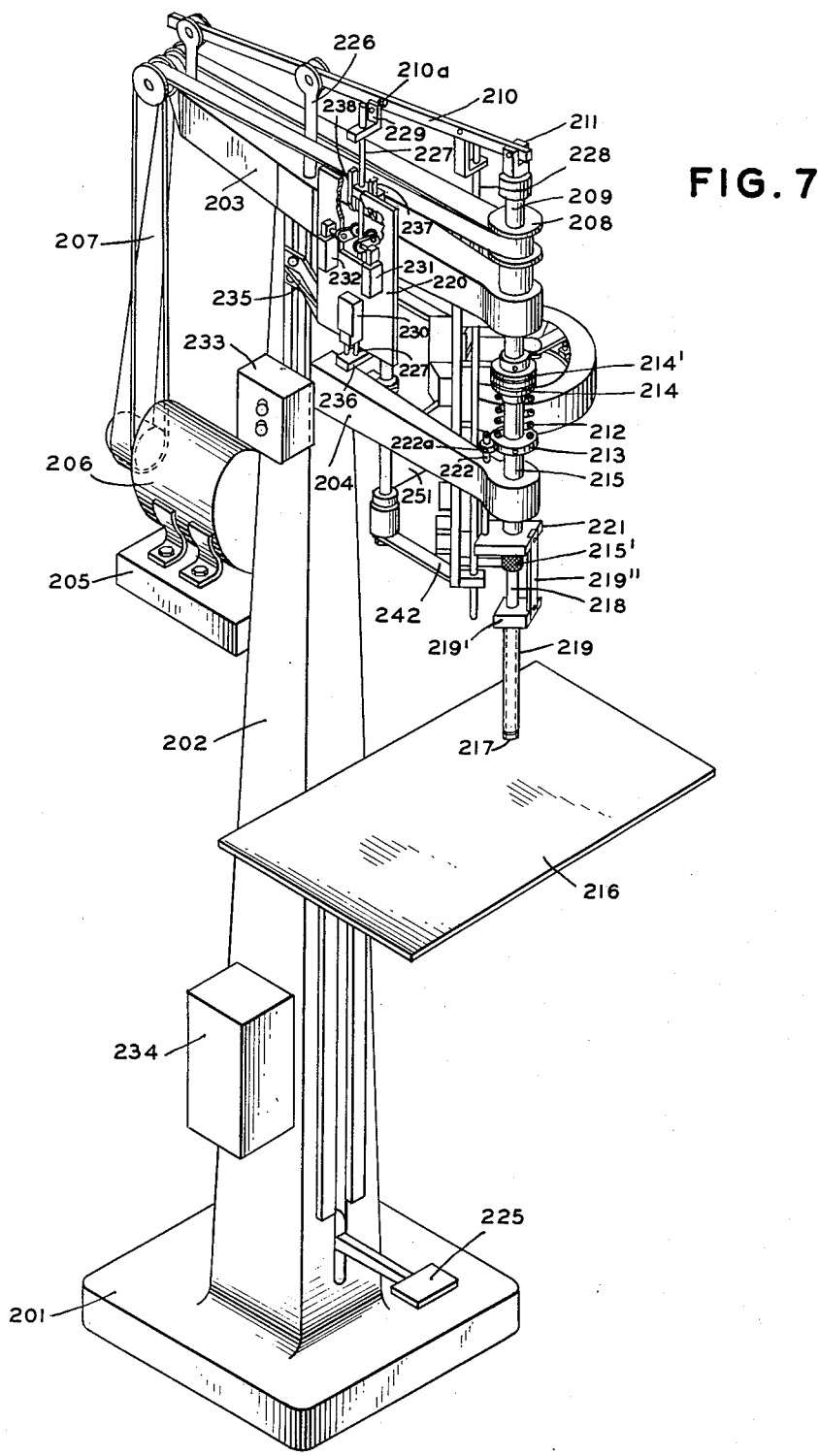
FIGURE 7 shows a side view, in perspective, of a more detailed embodiment of the principles of my invention applied to an automatic screw-driver apparatus.

Referring to FIGURE 7, the apparatus is supported on a unitary supporting frame consisting of a base 201, a supporting column 202, cantilever arms 203 and 204, and motor base 205. The screw-driver mechanism to be described is powered by an electric motor 206 connected through belt 207 to driving pulley 208 which is splined to drive shaft 209 so that said shaft, though constantly rotating, may be at the same time moved vertically with respect to said pulley. The drive shaft 209 is effectively suspended from operating beam 210 by means of a yoke 211 adapted to form a support and a suspension bearing for the rotating shaft in any well known or conventional manner. The operating beam 210 is pivoted at one end and connected to vertical rod 226 extending downward to the base of the mechanism where it is connected to foot treadle 225. Movement of this treadle is thus communicated to beam 210 and causes corresponding vertical movement of shaft 209. Springs (not shown) acting on vertical shaft 226 tend to return this shaft to a normally raised position.

Figure 11:
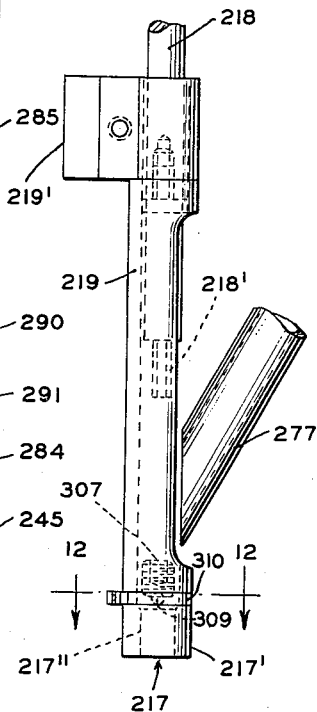
FIGURE 11 is a fragmentary detail view of the driving mechanism of FIGURES 7 and 8.
Figure 10:
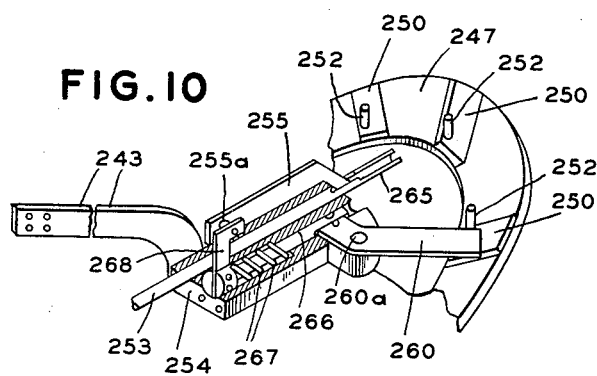
FIGURE 10 is a fragmentary detail view of the feeder mechanism of FIGURE 8.

Shaft 209 consists of an upper section driven by pulley 208 and a lower section or spindle 215 operated through a friction clutch mechanism of conventional design. At the lower end is attached a wrench 218 (FIG. 11) or other appropriate screw-driving tool, having a driving bit 218'. At the lower end of said wrench 218 and surrounding it, as shown in FIGS. 7 and 11, is a hollow finger 219 having a flange 219', in which said wrench is journaled. Said flange 219' is connected by a bar 219" with a plate 221 through which the spindle 215 passes and from which a guide rod 222 extends upwardly through a hole in the arm 204, thereby preventing rotation of said plate 221 and finger 219 connected thereto. Said plate 221 rests upon a flange or hub 215' of the spindle 215, so that said plate 221 and finger 219 may move downwardly with said spindle, until further downward movement of said plate and finger is prevented by engagement of a stop lug 222a on the rod 222 with the upper surface of the arm 204, without, however, interfering with further downward movement of the spindle 215 and wrench 218. During the subsequent upward movement of the spindle 215, the hub 215' thereof engages the plate 221 and restores the finger 219 and stop lug 222a to their upper positions shown in FIGS. 7 and 8. Conveniently, the wrench 218 may be attached to the spindle 215 by suitably securing the upper end of said wrench into an opening in the aforementioned hub 215'. The stop lug 222a is adjustably set on the rod 222 to limit downward motion of said rod and attached parts to an amount corresponding to the point at which the end of said finger 219 is juxtaposed to the screw hole in a workpiece (not shown) resting on platform 216. A screw holder 217 (FIGS. 11 and 12) incorporated in the end of this finger is adapted to hold a screw 307 in readiness to be driven in said workpiece. Electrical power is supplied to the machine through tumbler switch 233.

The clutch mechanism connecting the shaft 209 and spindle 215 comprises a friction disc 214 slidable on the spindle 215 and splined thereto, and a friction disc 214' secured to the shaft 209 and engageable by the disc 214. A spring 212, interposed between said disc 214 and a flange 213 on the spindle 215, urges said disc 214 into engagement with the disc 214' with a pressure which varies with the extent of compression of the spring.

In operation, the motor 27 drives shaft 209 at a constant rotational speed. In the raised position of said shaft, the disc 214 engages disc 214' with only a light pressure, with resultant slight drag tending to cause a slow rotation of the lower spindle 215. As the foot treadle 225 is depressed, the whole shaft assembly, including spindle 215 and finger 219, moves downward, and, when the finger 219 reaches a point such that the screw holder 217 is opposite a hole in a workpiece prepared for receiving a screw, the motion of said finger is stopped. The motion of the spindle, however, continues until the terminating wrench member 218', which is rotating slowly, engages the socket of a screw held by the screw holder 217, pressing it out of the holder into the threaded hole of the workpiece. The pressure of this engagement increases the compression of the clutch spring 212 and thus forces the disc 214 against the disc 214' with increased pressure, whereby more rapid rotation is imparted to the spindle and attached wrench, thereby quickly driving home the screw.

It may be stated that the apparatus and its operation thus far described in connection with FIGURE 7 are entirely conventional, being described herein as typical of a class of machine to which my invention may be applied, and no invention is hereby claimed for it.

Figure 12:
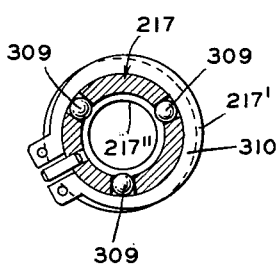
FIGURE 12 is a detail cross sectional view, with parts in elevation, of the screw-holding mechanism, taken on line 12—12 of FIGURE 11.

As shown in FIG. 12, the screw holder 217 has three holes, equally spaced circumferentially in its wall, and slightly conical in shape for retaining three balls 309 in a manner to partly protrude into the bore of said holder. A resilient snap ring 310 is fitted around the holder wall and provides spring pressure against the balls 309 so that they normally protrude into the holder bore but may be pushed rearward against the action of the spring as the screw is pushed downwardly between them by the screw driver to engage the work piece.

In FIG. 11 I have shown the screw holder 217 provided with a downwardly extending tube portion 217', of a length not less than the free length of a screw and having a passage 217" of a diameter more closely equal to the screw diameter than is the diameter of the passage above the retaining balls 309. In the event that a screw is slightly cocked when resting on the retaining balls, the narrower passage 217" in the extension 217 corrects any misalignment of the screw as it passes through said balls 309 under the action of the wrench or screw driver bit 218', and insures passage of the screw into the work piece in proper alignment therewith.

With further reference to FIGURE 7, there are also attached to the beam 210 two operating rods 227 and 228 which together perform functions which may be identified in FIGURE 1 by the single rod 22. The former rod (227) is attached to the beam through a right-angle-link 229 rotatably fitted to pivot 210a and fixed to said rod. The rod is held vertical by support members (not shown) attached to the back of mounting plate 220 adapted to permit slidable motion in conformity with the motion of said operating beam. On plate 220 are located three trip switches, 230, 231, and 232, which may be identified in function with switches 27, 28, and 29, respectively, of FIGURES 1 and 2. The trip switches 231 and 232 are of a class that are operated, as shown in FIGURE 7, by cams deflected by contact with trip members 237 and 238. Switch 230, on the other hand, is also of a well-known form in which operation is by raising or lowering a vertical plunger from the bottom as in this case in cooperation with trip member 236 attached to the bottom of the operating rod 227, which, as above noted, extends downwardly in back of the panel 220. Trip members 236, 237, and 238 fixed to operating rod 227 are appropriately disposed on said rod that engagement is made with switch cams in such sequence related to the motion of the rod that a cycle of events is electrically established in accordance with operations hereinbefore described. Box 234 houses a time-delay relay of standard design which corresponds exactly to relay 70 in FIGURE 2.

Figure 8:
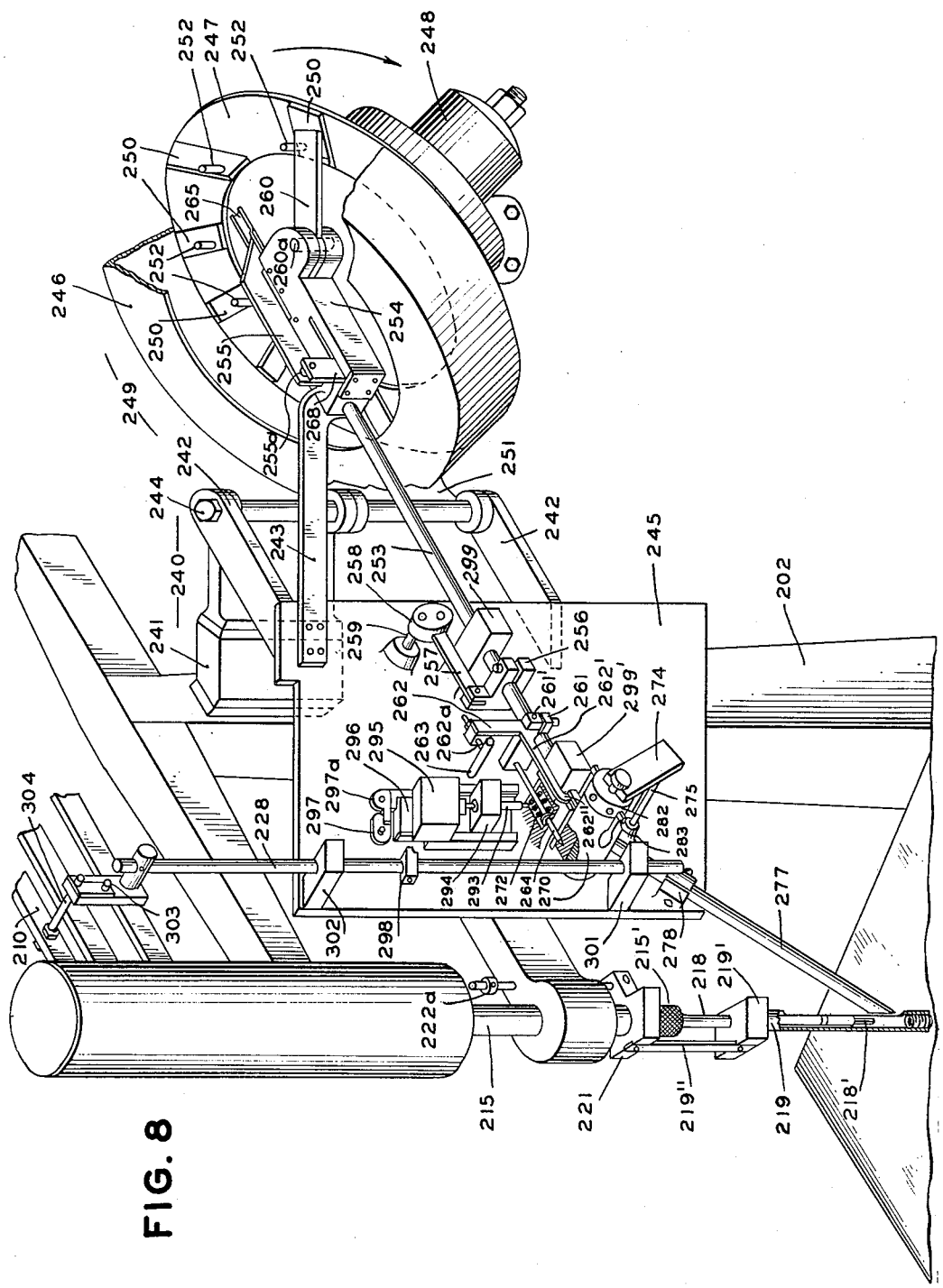
FIGURE 8 shows in further detail the embodiment of FIGURE 7 viewed from the right side.

In FIGURE 8 is shown in perspective a right-hand view of the machine illustrating, in particular, the mounting arrangements and mechanical details for the feeding and orienting mechanism embodying the principles of my invention.

A hinged bracket 240, consisting of fixed bracket 241 welded or otherwise attached to supporting column 202, a king pin 244, movable arms 242, plate 245, arm 251, and a bracket 243, bears the entire operating mechanism and is thereby adaptable to be rotated as a unit out of engagement with the screw-driving machine in a manner to allow access to otherwise not easily accessible operating components for purposes of service or maintenance. The said rotation involves the disengagement of a linkage connecting the screw-driving machine with operating components of the present invention. This takes place at linkage 303 which slidably engages pin 304 on which it is normally journaled. The normal functions of these connecting parts will be described hereinafter. When the mounting plate 245 and associated parts are swung away from the screw driver, about the axis of the king pin 244, the link 303 readily slides off the pin 304. In restoring said mounting plate to its normal (FIG. 8) position, the link 303 may readily be guided by hand into position to register with the pin 304.

The motor and speed-reducer unit 248 driving the feed hopper 249 is supported by arm 251. The hopper itself comprises a partially enveloping fixed cover 246 and a revolving distributor plate 247. Fixed at regular intervals on the plate 247 are radially dispersed, raised flights 250 against the forward edge of which screws may rest in substantially radial alignment. The hopper is tilted at such an angle that a supply of screws placed in the hopper tends to remain in the lower end of the hopper until picked up by the flights 250 as they pass through the mass of supply material. At intervals on the plate 247 are placed upright pins 252 designed to engage a trip lever 260 as each flight 250 passes the trip lever. The trip lever is part of a kicker mechanism 254 associated with the input end of feed tube 253 with which it slidably engages and together with which it is supported by cantilever strap 243. The mechanism may be seen in somewhat better detail in FIGURE 10.

In this figure, the input end of feed tube 253 is seen to be cut away to form a trough section 265. This tube is also further slotted lengthwise to receive the toe section of kicker plate 255. The plate is loosely pivoted at point 255a, and the trailing edge of said toe section is formed at an angle such that, in its retracted position, it is caused to slide upward to uncover the hole in tube 253, and, when thrust forward, it drops into the bottom of said trough section. The housing 254 of the kicker mechanism is here shown in section to expose the operating elements. In a longitudinal hole offset from the feed tube 253 is located the operating plunger 266. One end is slotted to receive an end of the aforementioned trip lever 260, and a pin forms a sliding pivot between the two. The lever is pivoted about pin 260a. The other end of said hole is of somewhat enlarged diameter to receive a spring 267 adapted to exert pressure on a cap fixed to the end of plunger 266. At this end is fixed the arm 268 to which is pivotally attached the kicker plate 255.

The operation of the feed apparatus thus far enumerated may be described as follows:

A quantity of screws of uniform size but of heterogeneous orientation is loaded into the hopper 249, the distributor plate of which is in constant rotation. Because of the angle at which the unit is mounted, the screws tend to accumulate at the bottom of the hopper, but the rotating plate 247 picks up one or more on the radial flights 250 as they pass. The rotation of the distributor plate brings each flight successively to the top of the hopper opposite to the trough-like end of the feeder tube where the angle is such that they slide off into the trough 265. In falling into the trough, it will be apparent that, of several screws, some may fall into the bottom of the trough and be properly aligned to slide into the feed tube, others may roll off and fall down into the bottom of the hopper to be recycled, and still others may become lodged crosswise of the trough and obstruct the entrance to the feed tube. To eliminate any of the latter screws, shortly after each flight passes the trough, a pin 252 engages the trip lever 260 which gives a momentary "kick" to plate 255. This moves forward and pushes all remaining screws out of the trough and is immediately retracted, leaving the feed tube open to receive screws from the next succeeding position of the distributor plate. These operations are independent of all other operations of the orienting mechanism and are designed solely to keep the feed tube full of screws without regard to their orientation.

Figure 9:
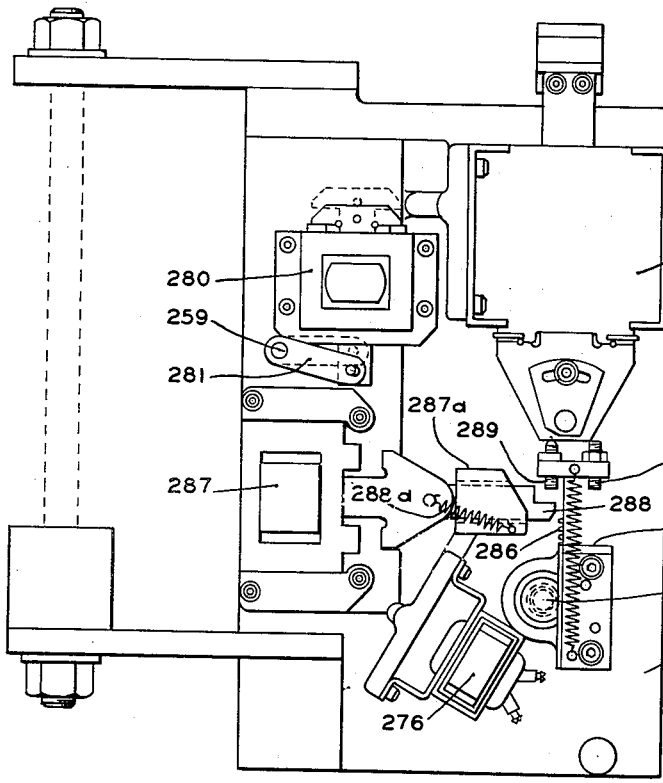
FIGURE 9 shows a back view of the mounting plate for the orienting mechanism.

Referring again to FIGURE 8, mounting plate 245 supported by arms 242 bears the essential elements of the orienting features of my invention. Feed tube 253 is slidably supported by pillars 299 and 299'. A bracket 256, which, as shown, may comprise a split block having arms embracing the tube 253 and clamped thereto by a screw passing through one of said arms and into the other, is linked to an eccentric arm 258 by link member 257. A shaft 259, on which said arm 258 is pinned, transmits motion to said arm and link from a solenoid actuator 280 mounted on the back of the panel (FIGURE 9). The link 281, slidably pivoted on the solenoid plunger, enables the linear motion of said solenoid to move shaft 259 and, hence, tube 253 through the linkage system on the front of the panel.

Also clamped to said feed tube 253 in a manner similar to the bracket 256, is a second bracket member 261, in a recess in which a right-angle gate member 262 is pivoted at 261', above said tube. One arm, 262', of this gate extends in the direction of the exit end of the feed tube and, at its end, has a further right-angle projection 262" which is adapted to fit into a slot cut in the end of the feed tube. This arm is spring-loaded to hold normally the end projection 262", forming a gate, in the end of the feed tube, thus obstructing it. The vertical arm of member 262 is adapted to engage fixed stop 263 at a predetermined point in the movement of tube 253, thus deflecting said arm, as well as the arm 262', and removing the obstruction 262" at the end of said feed tube. The actual point of contact of the deflectable arm 262 with stop 263 is determined by an adjustable pin 262a threaded through a block forming an offset extension of arm 262, as shown.

Bracket 261 also slidably supports an indexing pin 264 which extends through a guide hole in fixed pillar 260 and enters a locating hole in the orienting head 270 to fix the position of said head at a position at which the feed tube is in exact registration with the receiving aperture in said orienting head. Pillar 299 is shown partially cut away to expose the recess in said pillar which accommodates a spring 272 which exerts force on a collar attached to the pin 264, tending to urge it into the locating hole. On the outer end of said pin is another collar (not shown) which, when the feed tube is withdrawn to the right, engages with bracket 261 and pulls pin 264 out of said locating hole in the orienting head. This head, as illustrated in FIGURE 8, shows a cut-away section in which the pin 264 is inserted into the locating hole. It will be apparent that, if desired, one or more other holes, corresponding to any other positions of the orienting head, may be provided in said head for cooperation with one or more pins for locating said head in said positions, in coordination with movements of said feed tube 253 or otherwise.

The orienting head 270 has been shown in detail in FIGURES 3 and 4. As shown in FIGURE 8, gate member 283 attached to the separable member 282 of the orienting head is in a closed position. Operation of member 282 is through forked link 274 connected to operating rod 275, which may be translatably moved by a solenoid 276 located on the reverse side of the mounting panel 245 (see FIGURE 9).

FIGURE 9 also shows the operating elements of the orienting head. Numeral 284 denotes the axis of the operating shaft of said orienting head which terminates in a gear engaging with rack 286. Said rack is integral with the operating plunger of solenoid 285. The travel of said plunger is limited to the point of contact of pin 289 attached to the plunger with stop 288, or, alternatively, if said stop is withdrawn by action of solenoid 287, to the point of contact of pin 290 with stop 291. These several positions of said plunger are communicated rotatively to the orienting head on the front of the panel (FIGURE 8) and determine corresponding positions of that head. The stop 288, as shown, is directly connected to the plunger of the solenoid 287 and is movable slidably in a guide 287a fixed on the panel 245. A spring 288a maintains the stop in position for engagement by pin 289 when the solenoid 287 is de-energized. Discharge tube 277 is fixed in support bracket 278 attached to said panel.

The sensing mechanism consists of sensing pin 293, guided by a hole in block 294 and operatively connected to plunger switch 295. Said switch is attached to and adapted to slide with base plate 296. This plate is attached to a broken link 297, the right half, 297a, of which is fixed to the base plate 296, and the left-hand half of which, pivotally attached to mounting plate 245, forms a dog member rotatable when engaged by finger 298 on shaft 228. On engagement of the finger 298 with said dog member when shaft 228 is moved in a downward direction, the dog rotates in a counterclockwise manner allowing the finger to pass the dog member. On the upward excursion of rod 228, the passage of finger 298 by the dog section of member 297 causes the two halves of said member to mate and, through sliding contact between said dog and the section 297a, as said dog is deflected by the ascent of finger 298, to force said section 297a and the switch mounting, together with switch and sensing pin 293, downward. A spring (not shown) returns these parts to a normal position after finger 298 has passed. The operating rod 228 just referred to is slidably guided by supports 301 and 302 and attaches to operating beam 210 through a detachable linkage member 303 slidably engaging pin 304.

As has been previously stated, the operating rods 227 and 228 of FIGURE 7 perform functions accomplished by the rod 22 in FIGURE 1; the three trip switches 230, 231, and 232 of FIGURE 7 correspond with switches 27, 28 and 29 of FIGURES 1 and 2, while the time relay 70 of FIGURE 2 is housed in the box 234 in FIGURE 7. It will further be apparent that the other elements illustrated in FIGURES 1–4 correspond to parts in the mechanism shown in FIGURES 8 and 12. For instance, the feed tube 253 of FIGURES 8 and 10 performs the functions of tube 12 of FIGURE 1; orienting head 270 of FIGURE 8 corresponds to the orienting head 14 in FIGURES 1–4; the magnets 276, 280, 285, and 287 in FIGURE 9 correspond respectively to magnets 61, 65, 52, and 55 of FIGURE 2; the sensing finger 292, switch 295, dog-link 297, and trip finger 298 in FIGURE 8 correspond respectively to sensing finger 35, switch 15, dog-link 31, and trip finger 30 in FIGURES 1 and 2; and the discharge tube 277 and screw-receiving finger 219 of FIGURES 1–3, correspond respectively to the elements designated 17 and 18 in FIGURES 1 and 2.

The feeding and orienting operations of my invention having been fully explained in connection with the schematic views appearing in FIGURES 1 and 2, and the parts shown in those views being readily identifiable with the corresponding parts in the detailed mechanisms illustrated in FIGURES 7–12, further description of the operation is unnecessary.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. Orienting apparatus for objects which are distinguishable by a predominant characteristic in one end, comprising a feeder tube bearing said objects in random orientation, rotatable receptacle means adapted to receive said objects one by one and expose one end of each of same to inspection, a first gate member in said feeder tube adaptable for controllably feeding said objects to said receptacle means, a second gate member in said receptacle means for controllably retaining a said object during inspection and orientation, orientation-sensing means responsive to said predominant characteristic at the exposed end of said object, an output tube through which said objects are discharged, actuating means for moving said receptacle means to a first position in operative association with said feeder tube to receive one of said objects from said tube and to a second position juxtaposed to said orientation-sensing means and for rotating said receptacle means through 180 degrees, and means for controlling said actuating means so that said receptacle means is successively moved to said first and second positions and in response to said sensing means for opening said second gate member to release a properly oriented object to said discharge tube and for rotating said receptacle means through said 180 degrees to release an initially improperly oriented object into said discharge tube.

2. Orienting apparatus as set forth in claim 1, in which means are provided by which, in said first position of said receptacle means said feeder tube is brought into registration with said receptacle means, and said first gate member is deflected to release an object to said receptacle means.

3. Orienting apparatus as set forth in claim 1, in which one of said orientation-sensing means and said object has a projecting member and the other has a depressed area.

4. Orienting apparatus as set forth in claim 1, in which said receptacle means comprises a cylindrical member with a diametrically drilled hole for receiving the said object, said hole being slotted lengthwise to slidably receive said second gate member, a separable member concentric with said cylindrical member and attached to said second gate member, said second gate member being adapted to be inserted into or withdrawn from said hole for any position of said cylindrical member, motor means to operate said separable member, in which said actuating means comprises rack and pinion means to rotate said receptacle means and motor means operatively associated with said rack and pinion means, and in which said control means comprises a stop member for determining a position of said rack and pinion means intermediate between fully withdrawn and fully extended position of said motor means and motor means for positioning said stop member.

5. Orienting apparatus for objects which are distinguishable by a predominant characteristic in one end, comprising a feeder tube bearing said objects in random orientation, rotatable receptacle means adapted to receive said objects one by one and expose one end of each of same to inspection, a first gate member in said feeder tube adaptable for controllably feeding said objects to said receptacle means, a second gate member in said receptacle means for controllably retaining a said object during inspection and orientation, orientation-sensing means responsive to said predominant characteristic at the exposed end of said object, an output tube through which said objects are discharged, actuating means for moving said receptacle means to a first position in operative association with said feeder tube to receive one of said objects from said tube and to a second position juxtaposed to said orientation-sensing means and for rotating said receptacle means through 180 degrees, and means for controlling said actuating means including cam-operated electrical switches so that said receptacle means is successively moved to said first and second positions and in response to said sensing means for opening said second gate member to release a properly oriented object to said discharge tube and for rotating said receptacle means through said 180 degrees to release an initially improperly oriented object into said discharge tube.

6. Orienting apparatus for objects which are distinguishable by a predominant characteristic in one end, comprising means for feeding said objects in random orientation, means movable between three positions for receiving said objects in succession and exposing an end of each to inspection, means responsive to the exposed end of an object in said receiving means for sensing the orientation of said objects, discharge means for the passage of objects from said receiving means, means for shifting said receiving means into its first position for receiving an object from said feeding means and for shifting said receiving means with said object into its second position for presenting the exposed end of said object to said orientation-sensing means, gate means cooperating with said receiving means for retaining said object therein, means for operating said gate means after said receiving means is shifted into its second position to release said object to said discharge means, and means controlled by said orientation-sensing means in response to the presence of an improperly oriented object in said receiving means for preventing operation of said gate means and for shifting said receiving means to its third position for presenting said object in properly oriented relation to said discharge means.

7. Orienting apparatus for objects which are distinguishable by a predominant characteristic in one end, comprising means for feeding said objects in random orientation, means movable between three positions for receiving said objects in succession and exposing an end of each to inspection, means responsive to the exposed end of said objects in said receiving means for sensing the orientation of said objects, discharge means for the passage of objects from said receiving means, means for shifting said receiving means into its first position for receiving an object from said feeding means and for shifting said receiving means with said object into its second position for presenting the exposed end of said object to said orientation-sensing means, gate means cooperating with said receiving means for retaining said object therein, means for operating said gate means after said receiving means is shifted into its second position to release said object to said discharge means, means controlled by said orientation-sensing means in response to the presence of an improperly oriented object in said receiving means for preventing operation of said gate means and for shifting said receiving means to its third position for presenting said object in properly oriented relation to said discharge means, and means for restoring said receiving means from its third position to its first position for receiving objects from said feeding means.

8. Orienting apparatus for objects which are distinguishable by a predominant characteristic in one end, comprising orienting means for receiving said objects successively in random orientation and exposing an end of each for inspection, means for feeding said objects succesively to said orienting means, means responsive to the exposed end of an object in said orienting means for sensing the orientation of said object, discharge means for the passage of objects from said orienting means to a discharge point, means for effecting relative movement between said orienting means and said feeding means into position for transferring an object from said feeding means to said orienting means and for shifting said orienting means with one of said objects received thereby to an inspection position whereby an end of said received object is in position for cooperation with said orientation-sensing means, means for shifting said orientation-sensing means for sensing said end of said received object when said orienting means is in said inspection position, gate means for retaining said received object in said orienting means, means for operating said gate means after said orientation-sensing means is shifted for releasing said received object to said discharge means when it is properly oriented, and means controlled by said orientation-sensing means in response to the presence of an improperly oriented object for preventing operation of said gate means and for shifting said orienting means into another position for presenting said received object to said discharge means in properly oriented relation.

9. Orienting apparatus for objects which are distinguishable by a predominant characteristic in one end, comprising orienting means for receiving said objects successively in random orientation and exposing an end of each for inspection, means for feeding said objects successively to said orienting means, means responsive to the exposed end of an object in said orienting means for sensing the orientation of said object, discharge means for the passage of objects from said orienting means to a discharge point, means for effecting relative movement between said orienting means and said feeding means into position for transferring an object from said feeding means to said orienting means, means for rotating said orienting means with one of said objects received thereby to an inspection position whereby an end of said received object is in position for cooperation with said orientation-sensing means, means for shifting said orientation-sensing means for sensing said end of said received object when said orienting means is in said inspection position, gate means for retaining said received object in said orienting means, means for operating said gate means after said orientation-sensing means is shifted for releasing said received object to said discharge means when it is properly oriented, and means controlled by said orientation sensing means in response to the presence of an improperly oriented object for preventing operation of said gate means and for rotating said orienting means into another position for presenting said received object to said discharge means in properly oriented relation.

10. Orienting apparatus for objects which are distinguishable by a predominant characteristic in one end, comprising orienting means for receiving said objects successively in random orientation and exposing an end of each for inspection, means for feeding said objects successively to said orienting means, means responsive to the exposed end of an object in said orienting means for sensing the orientation of said object, discharge means for the passage of objects from said orienting means to a discharge point, means for effecting relative movement between said orienting means and said feeding means into position for transferring an object from said feeding means to said orienting means, means for sequentially rotating said orienting means with one of said objects received thereby to an inspection position whereby an end of said received object is in position for cooperation with said orientation-sensing means and to another position, means normally preventing rotation of said orienting means beyond said inspection position, means for shifting said orientation-sensing means for sensing said end of said received object when said orienting means is in said inspection position, gate means for retaining said received object in said orienting means, means for operating said gate means after said orientation-sensing means is shifted for releasing said received object to said discharge means when it is properly oriented, and means controlled by said orientation sensing means in response to the presence of an improperly oriented object for preventing operation of said gate means and for rendering ineffective said rotation-preventing means whereby said orienting means is rotated to said another position in which said object is presented to said discharge means in properly oriented relation.

11. Orienting apparatus for objects which are distinguishable by a predominant characteristic in one end, comprising orienting means for receiving said objects successively in random orientation and exposing an end of each for inspection, means for feeding said objects successively to said orienting means, means responsive to the exposed end of an object in said orienting means for sensing the orientation of said object, discharge means for the passage of objects from said orienting means to a discharge point, means for rotating said orienting means to a first position for receiving an object from said feeding means, means for shifting said feeding means longitudinally to deliver an object to said orienting means, means for sequentially rotating said orienting means with one of said objects received thereby to an inspection position whereby an end of said received object is in position for cooperation with said orientation-sensing means and to another position, means normally preventing rotation of said orienting means beyond said inspection position, means for shifting said orientation-sensing means into engagement with said end of said received object when said orienting means is in said inspection position, gate means for retaining said received object in said orienting means, means for operating said gate means after said orientation-sensing means is shifted for releasing said received object to said discharge means when it is properly oriented, and means controlled by said orientation-sensing means in response to the presence of an improperly oriented object for preventing operation of said gate means and for rendering ineffective said rotation-preventing means whereby said orienting means is rotated to said another position in which said object is presented to said discharge means in properly oriented relation.

12. Orienting apparatus for objects having ends distinguishable from each other by a predominant characteristic, comprising a rotatable member having an opening extending therethrough, means for rotating said member in one direction to a first position for receiving one of said objects in one end of said opening and for rotating said member with an object therein in the opposite direction, means normally preventing rotation of said member in said opposite direction beyond a second position in which the end of said object is presented for inspection, gate means in said member for retaining said object in said opening, means for withdrawing said gate means to release said object to a point of discharge, and means responsive to an improperly oriented object in said member in said second position for preventing withdrawal of said gate means and for rendering ineffective said rotation preventing means to release said member whereby the latter is rotated beyond said second position to a third position in which said object is discharged in properly oriented relation.

13. Orienting apparatus for objects which are distinguishable by a predominant characteristic in one end, comprising means for feeding said objects in random orientation, means movable between three positions for receiving said objects in succession and exposing an end of each to inspection, means responsive to the exposed end of an object in said receiving means for sensing the orientation of said objects, discharge means for the passage of objects from said receiving means, means for shifting said receiving means into its first position for receiving an object from said feeding means and for shifting said receiving means with said object into its second position for presenting the exposed end of said object to said orientation-sensing means, gate means cooperating with said receiving means for retaining said object therein, means for operating said gate means after said receiving means is shifted into its second position to release said object to said discharge means, means controlled by said orientation-sensing means in response to the presence of an improperly oriented object in said receiving means for preventing operation of said gate means and for shifting said receiving means to its third position for presenting said object in properly oriented relation to said discharge means, and means cooperating with said receiving means for locating the latter positively in one of the positions to which it is shifted.

14. Orienting apparatus for objects which are distinguishable by a predominant characteristic in one end, comprising means for feeding said objects in random orientation, means movable between three positions for receiving said objects in succession and exposing an end of each to inspection, means responsive to the exposed end of an object in said receiving means for sensing the orientation of said objects, discharge means for the passage of objects from said receiving means, means for shifting said receiving means into its first position for receiving an object from said feeding means and for shifting said receiving means with said object into its second position for presenting the exposed end of said object to said orientation-sensing means, gate means cooperating with said receiving means for retaining said object therein, means for operating said gate means after said receiving means is shifted into its second position to release said object to said discharge means, means controlled by said orientation-sensing means in response to the presence of an improperly oriented object in said receiving means for preventing operation of said gate means and for shifting said receiving means to its third position for presenting said object in properly oriented relation to said discharge means, and means comprising a projection movable into an opening in said receiving means for locating said receiving means positively in one of the positions to which it is shifted.

15. Orienting apparatus for objects which are distinguishable by a predominant characteristic in one end, comprising means for feeding said objects in random orientation, means movable between three positions for receiving said objects in succession and exposing an end of each to inspection, means responsive to the exposed end of an object in said receiving means for sensing the orientation of said objects, discharge means for the passage of objects from said receiving means, means for shifting said receiving means into its first position for receiving an object from said feeding means and for shifting said receiving means with said object into its second position for presenting the exposed end of said object to said orientation-sensing means, gate means cooperating with said receiving means for retaining said object therein, means for operating said gate means after said receiving means is shifted into its second position to release said object to said discharge means, means controlled by said orientation-sensing means in response to the presence of an improperly oriented object in said receiving means for preventing operation of said gate means and for shifting said receiving means to its third position for presenting said object in properly oriented relation to said discharge means, and means comprising a projection movable into an opening in said receiving means for locating said receiving means positively in one of the positions to which it is shifted, and electromagnetic means controlling said projection.

16. Orienting apparatus for objects which are distinguishable by a predominant characteristic in one end, comprising means for feeding said objects in random orientation, means movable between three positions for receiving said objects in succession and exposing an end of each to inspection, means responsive to the exposed end of an object in said receiving means for sensing the orientation of said objects, discharge means for the passage of objects from said receiving means, means for shifting said receiving means into its first position for receiving an object from said feeding means and for shifting said receiving means with said object into its second position for presenting the exposed end of said object to said orientation-sensing means, gate means cooperating with said receiving means for retaining said object therein, means for operating said gate means after said receiving means is shifted into its second position to release said object to said discharge means, means controlled by said orientation-sensing means in response to the presence of an improperly oriented object in said receiving means for preventing operation of said gate means and for shifting said receiving means to its third position for presenting said object in properly oriented relation to said discharge means, and means cooperating with said receiving means for locating the latter positively in position for receiving an object from said feeding means.

References Cited in the file of this patent

UNITED STATES PATENTS

| | | |
|---|---|---|
| 233,062 | Barlow | Oct. 12, 1880 |
| 699,565 | Pugh | May 6, 1902 |
| 1,195,571 | Flaherty | Aug. 22, 1916 |
| 1,502,053 | Nordstrom | July 22, 1924 |
| 1,723,346 | Griswold | Aug. 6, 1929 |
| 1,863,314 | Phelps et al. | June 14, 1932 |
| 2,264,105 | White | Nov. 25, 1941 |
| 2,327,074 | Snyder | Aug. 17, 1943 |
| 2,373,992 | Billinghurst | Apr. 17, 1945 |
| 2,545,888 | Louden | Mar. 20, 1951 |
| 2,630,221 | Stewart | Mar. 3, 1953 |
| 2,638,945 | Austin | May 19, 1953 |
| 2,657,721 | Shaff | Nov. 3, 1953 |
| 2,670,077 | Drew | Feb. 23, 1954 |
| 2,670,770 | Potterton | Mar. 2, 1954 |
| 2,690,856 | Trondle | Oct. 5, 1954 |
| 2,696,285 | Zenlea | Dec. 7, 1954 |
| 2,706,504 | Moore | Apr. 19, 1955 |
| 2,710,712 | Friedman | June 14, 1955 |
| 2,754,860 | Moore et al. | July 17, 1956 |
| 2,803,274 | Zubal et al. | Aug. 20, 1957 |
| 2,806,494 | Kull | Sept. 17, 1957 |
| 2,810,248 | Dimond | Oct. 27, 1957 |
| 2,836,324 | Willis et al. | May 27, 1958 |
| 2,845,164 | Stahl | July 29, 1958 |

FOREIGN PATENTS

| | | |
|---|---|---|
| 347,176 | Great Britain | Apr. 14, 1931 |

UNITED STATES PATENT OFFICE
CERTIFICATE OF CORRECTION

Patent No. 2,997,202　　　　　　　　　　　　　　　August 22, 1961

Robert S. Madeux

It is hereby certified that error appears in the above numbered patent requiring correction and that the said Letters Patent should read as corrected below.

Column 5, line 31, for "release" read -- releases --; column 6, line 36, after "first" insert a comma; column 7, line 31, for "(VIIB)" read -- (VIIIB) --.

Signed and sealed this 6th day of February 1962.

(SEAL)
Attest:

ERNEST W. SWIDER　　　　　　　　　　　　　　　DAVID L. LADD
Attesting Officer　　　　　　　　　　　　　　　　Commissioner of Patents